3,278,380
METHODS OF CALMING EMPLOYING DIPHENYL HYDROXY CARBAMATE COMPOUNDS

Charles D. Bossinger, Kankakee, and Kelley G. Taylor, Decatur, Ill., assignors to Armour Pharmaceutical Company, Chicago, Ill., a corporation of Delaware
No Drawing. Filed Feb. 6, 1962, Ser. No. 171,354
4 Claims. (Cl. 167—65)

This invention relates to diphenyl hydroxy carbamate compounds and to an improved central nervous system treatment employing these compounds. The novel compounds of this invention are characterized by having a tertiary alcohol group bonded to the same carbon atom as the phenyl groups.

This patent application is in part a continuation of our co-pending patent application Serial No. 23,361, filed April 20, 1960. The subject matter of the present application is also disclosed in our copending application Serial No. 729,554, filed April 21, 1958, which was a continuation-in-part of our abandoned patent application Serial No. 554,132, filed December 20, 1955.

It is an object of this invention to provide improved central nervous system treatment in which central cholinergic action is minimized or eliminated. Another object is to provide improved central nervous system treatment in which there is obtained sedation or calming without cortical depressing effect, suppression of sympathetic hyperactivity, and anticonvulsive action as demonstrated by electroshock protection against metrazol and strychnine at therapeutic levels with minimal undesirable side effects. A further object is to provide improved central nervous system treatment in which there is also obtained an antipyretic analgesic action. Still another object is to provide an improved central nervous system treatment in which there is also obtained antiphlogistic action. Other objects and advantages will become apparent as the specification proceeds.

The improved central nervous system treatment of this invention involves administering to animals, i.e. mammals and fowls, especially man and domestic animals, at least one compound having the formula

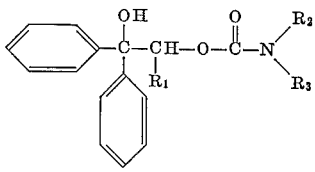

wherein $R_1$ is hydrogen, methyl or ethyl, and $R_2$ and $R_3$ are hydrogen, methyl, or ethyl. Specific preferred compounds of this class are: 2-hydroxy-2, 2-diphenylethyl carbamate, N,N-dimethyl-2, 2-diphenyl - 2 - hydroxyethyl carbamate, and 1,1-diphenyl - 1 - hydroxy - 2 - propyl carbamate.

In carrying out the central nervous system treatment of this invention, the special aromatic carbamates may be administered to the mammal, especially a human being, orally, as well as parenterally, e.g. by intravenous, subcutaneous or intraperitonal injection. These compounds are well-absorbed orally, and consequently this mode of administration is to be preferred. The administration of such compounds orally may be obtained as a powder, tablet, capsule, solution or suspension. The dosage at which desirable central nervous system treatment is obtained will, of course, vary with the individual compounds and with the species and physiology of the individual to which it is administered. Generally, however, the oral dosage for humans will range from 300 to 1600 mg. per day. A typical dosage would be 800 mg. per day given orally.

The preparation of the aromatic carbamates employed in this central nervous system treatment, and the preferred practice of such central nervous system treatment can be further appreciated by reference to the following specific examples:

Example I

The following method was utilized in the preparation of 2-hydroxy-2,2-diphenylethyl carbamate:

1,1-diphenylethylene carbonate, in the amount of 10 gms., was mixed with 200 ml. of a concentrated aqueous ammonium hydroxide solution. The resulting mixture was heated for a period of 1 hour on a steam bath. The solvent was separated from the reaction product under reduced pressure, and the separated reaction product was crystallized from chloroform. The crystallized reaction product, which was obtained in a yield of 5.9 gms., had a metling point of 169–170° C.

Example II

The following method was utilized in the preparation of N,N-dimethyl-2,2-diphenyl-2-hydroxyethyl carbamate:

1,1-diphenylethylene carbonate, in the amount of 5 gms., was mixed with 100 ml. of an aqueous 40% dimethylamine solution. The resulting mixture was heated on a steam bath for a period of 1 hour. The reaction mixture was then cooled, and the reaction product separated from residual liquid by filtration. The separation reaction product was obtained in a yield of 5.6 gms. This product was crystallized from chloroform to provide a substance having a melting point of 127–129° C.

Example III

The following method was utilized in the preparation of N,N-dimethyl-2,2-diphenyl-2-hydroxyethyl carbamate:

A solution of 32 gms. of phosgene in 200 ml. of benzene was added, drop-wise, to a stirred solution of 69 gms. of 1,1-diphenyl-1, 2-ethandiol in 600 ml. of benzene. These solutions were maintained at a temperature of 30° C. during the addition step.

The resulting reaction mixture was stirred for a period of 45 minutes, and then 48 gms. of diethylaniline in 100 ml. of benzene was added thereto while maintaining such mixture at a temperature of less than 40° C. This mixture was then stirred for an additional 2½ hours. Thereafter, about 500 ml. of ice water was added to the flask, and the benzene layer thereupon formed was separated from the aqueous layer and washed with an additional 500 ml. of ice water.

To the washed benzene solution was added 500 ml. of an aqueous 40% dimethylamine solution, while maintaining the solutions at a temperature of less than 10° C. The resulting mixture was warmed overnight to room temperature, whereupon no solid was formed in the flask.

The two layers of solution in the flask were separated, and the benzene layer was concentrated under reduced pressure. The reaction product was obtained as a white solid, and recrystallized from chloroform. This crystallized product, which was obtained in a yield of 77 gms., had a melting point of 128–129° C.

The dietylaniline reactant utilized in this process is a base acceptor. Other tertiary amines, such as triethylamine, can be utilized to remove hydrochloric acid from the reaction mixture.

Example IV

The following method was utilized in the preparation of 1,1-diphenyl-1-hydroxy-2-propyl carbamate:

1,1-diphenyl 1,2-propandiol, in the amount of 22.8 gms. (0.1 mole), in 200 ml. of ether was introduced into a 50 ml. round-bottom flask fitted with a mechanical stirrer, drying tube and dropping funnel. To this ether solution was added 8.5 ml. of pyridine, and thereafter the flask was cooled in an ice bath. Then, phenyl chlorocarbonate in the amount of 15.6 gms. (0.1 mole), in 50 ml. of ether was dropped into the flask, slowly, through the dropping funnel. After addition of the phenyl chlorocarbonate was completed, stirring of the resulting mixture was continued for a period of one hour at room temperature. Then, 10 ml. of ice water was introduced, dropwise, into the flask. Thereafter, the resulting phases were separated; the separated ether solution was washed with 25 ml. of ice water, three times, and then dried over anhydrous magnesium sulfate.

After the ether had been stripped off, the residue was introduced into liquid ammonia, and the resulting mixture was refluxed for a period of three hours. After the ammonia had evaporated, the residue was recrystallized from benzene. The recrystallized material was obtained in the amount of 10 gms. and demonstrated a melting point of 179–181° F. This material was subjected to analysis, and the following results were obtained:

|  | Percent C | Percent H | Percent N |
|---|---|---|---|
| Calculated | 70.83 | 6.32 | 5.16 |
| Analyzed | 70.36 | 6.33 | 4.72 |
|  | 70.60 | 6.29 | 4.91 |

While in the foregoing specification various embodiments of this invention have been set forth and specific details thereof elaborated for the purpose of illustration, it will be apparent to those skilled in the art that the invention is susceptible to other embodiments and that many of these details may be varied widely without departing from the basic concept and spirit of the invention.

We claim:

1. In central nervous system treatment of animals to obtain calming with a substantial absence of central cholinergic action comprising the administration to said animals, up to about 1600 mgs./day of at least one compound having the formula

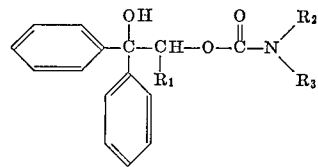

wherein $R_1$, $R_2$ and $R_3$ are selected from the class consisting of hydrogen, methyl, and ethyl.

2. In central nervous system treatment according to claim 1 comprising the administration of 1,1-diphenyl-1-hydroxy-2-propyl carbamate.

3. In central nervous system treatment according to claim 1 comprising the administration of 2-hydroxy-2,2-diphenylethyl carbamate.

4. In central nervous system treatment according to claim 1 comprising the administration of N,N-dimethyl-2,2-diphenyl-2-hydroxyethyl carbamate.

References Cited by the Examiner

UNITED STATES PATENTS

| 2,627,524 | 2/1953 | Malkemus | 260—482 |
| 2,649,473 | 8/1953 | Chenicek | 260—482 |
| 2,656,378 | 10/1953 | Berger | 260—482 |
| 2,890,984 | 6/1959 | Sahyun | 167—65 |
| 2,967,880 | 1/1961 | Finke et al. | 260—482 |
| 3,036,954 | 5/1962 | Robbins | 167—65 |

OTHER REFERENCES

Berger, J. of Pharm, Exptl. Therap., vol. 104, pp. 229–233 (1952).

JULIAN S. LEVITT, *Primary Examiner.*

DANIEL D. HORWITZ, LEON ZITVER, LEWIS GOTTS, *Examiners.*

D. CLARKE, P. SABATINE, S. ROSEN,
*Assistant Examiners.*